(12) United States Patent
Vaughan et al.

(10) Patent No.: US 8,224,972 B2
(45) Date of Patent: Jul. 17, 2012

(54) INVITATION TO BIND TO A DEVICE

(75) Inventors: Gregory Bjorn Vaughan, Santa Cruz, CA (US); Jeffrey H. Michaud, San Mateo, CA (US); Kazuhisa Yanagihara, Cupertino, CA (US); Bertrand Serlet, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/053,048

(22) Filed: Mar. 21, 2011

(65) Prior Publication Data

US 2011/0173311 A1 Jul. 14, 2011

Related U.S. Application Data

(63) Continuation of application No. 11/539,539, filed on Oct. 6, 2006, now Pat. No. 7,912,962.

(51) Int. Cl.
*G06F 15/16* (2006.01)
*G06F 12/00* (2006.01)
(52) U.S. Cl. ........................ 709/227; 709/250
(58) Field of Classification Search .......... 709/227–229, 709/203, 245–250
See application file for complete search history.

(56) References Cited

U.S. PATENT DOCUMENTS

| 5,928,363 | A  | * | 7/1999  | Ruvolo | 726/22 |
|---|---|---|---|---|---|
| 6,699,125 | B2 | * | 3/2004  | Kirmse et al. | 463/42 |
| 7,467,206 | B2 | * | 12/2008 | Moore et al. | 709/225 |
| 7,676,599 | B2 | * | 3/2010  | Cooney et al. | 709/245 |
| 2004/0215784 | A1 | * | 10/2004 | Qi et al. | 709/227 |
| 2006/0090070 | A1 | * | 4/2006  | Bade et al. | 713/164 |
| 2006/0126532 | A1 | * | 6/2006  | Binding et al. | 370/254 |
| 2007/0111796 | A1 | * | 5/2007  | C. Giaimo et al. | 463/42 |

OTHER PUBLICATIONS

"Setting up a Bonjour Name Server" [online] www.dns-sd.org [retrieved on Jul. 20, 2006]. Retrieved from the Internet: <URL: http://www.dris-sd.org/ServerSetup.html>.
"Bonjour Networking, simplified" [online]. Apple Computer, Inc., 2006, [retrieved on Jul. 20, 2006]. Retrieved from the Internet: <URL: http://www.apple.com/macosx/features/bonjour/>.

* cited by examiner

*Primary Examiner* — Zarni Maung
(74) *Attorney, Agent, or Firm* — Fish & Richardson P.C.

(57) ABSTRACT

A server device sends a list of account holders together with an invitation to bind to the server. A client device can decide to present the invitation to a user for decision only if the client device finds a match between the list and the user.

18 Claims, 5 Drawing Sheets

INVITATION TO BIND TO A DEVICE

CLAIM OF PRIORITY

This application is a continuation application, which claims priority benefit of U.S. Ser. No. 11/539,539, filed on Oct. 6, 2006, the entire contents of which are hereby incorporated by reference.

TECHNICAL FIELD

This invention relates to communication systems.

BACKGROUND

There are many situations where two or more devices should be connected to each other so that they can engage in communication and thereby exchange information. One example involves a server device, which typically has the ability to connect to several or many client devices. When a connection has been established, information can be exchanged continuously, or from time to time, in client-server communications. The process of establishing the connection that makes communication possible is sometimes referred to as binding one of the devices to the other.

One example of a technology that facilitates binding between devices is the Bonjour™ technology available from of Apple Computer in Cupertino, Calif. Using the Bonjour™ technology, computers and other devices can automatically broadcast the services they offer, and receive corresponding information from others. This can provide setup of a computer network. Thus, a potential client device (say an Apple computer running the Mac OS X operating system), can receive a Bonjour™ invitation either through a wireless or wired connection. Upon the client device presenting the invitation, the user can decide whether to accept it (e.g., and bind to the server device) or to decline the invitation.

SUMMARY

In a first general aspect, a computer-implemented method for inviting a device to bind to another device includes identifying, on a first device, at least one account for which another device has not been bound to the first device. The method includes transmitting, from the first device, an invitation to bind to the first device. The invitation includes information corresponding to an identifier for each of the identified at least one account.

Implementations can include any, none or all of the following features. When the at least one account is identified on a list of accounts for which another device has not been bound to the first device, and when after the invitation is transmitted a second device binds to the first device for an account on the list, the method can further include removing the account from the list after the binding. The invitation can include a link that can be activated to bind to the first device. The information can include, for each of the identified at least one account, a name of an account holder. The information corresponding to the identifier can be generated by encrypting the identifier. The first device can be a server device and the invitation can be transmitted to at least one client device.

In a second general aspect, a computer-implemented method for handling an invitation to bind to a device includes receiving an invitation to bind to a first device. The invitation is received at a second device and identifies at least one account on the first device for which no device has been bound to the first device. The method includes determining whether the identified at least one account matches the second device. The method includes presenting the invitation, if a match is determined, so that a user of the second device can choose whether to bind to the first device, else not presenting the invitation to the user.

Implementations can include any, none or all of the following features. When the invitation is presented to the user and the user does not initiate binding to the first device, the method can further include providing that the invitation is not presented to the user again. The invitation can include a link that the user can activate to bind the second device to the first device. The invitation can include, for each of the identified at least one account, a name of an account holder. Determining whether there is a match can include determining whether the name of the account holder matches a user name for the second device. The method can further include reversing an encryption of the invitation to determine the at least one account. The first device can be a server device and the second device can be a client device.

Implementations can feature any, none or all of the following advantages: Providing that server invitations are filtered out and not presented on a client device based on a low likelihood that the user will want to establish a connection; providing improved establishment of client-server relationships; and providing a more user-friendly device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
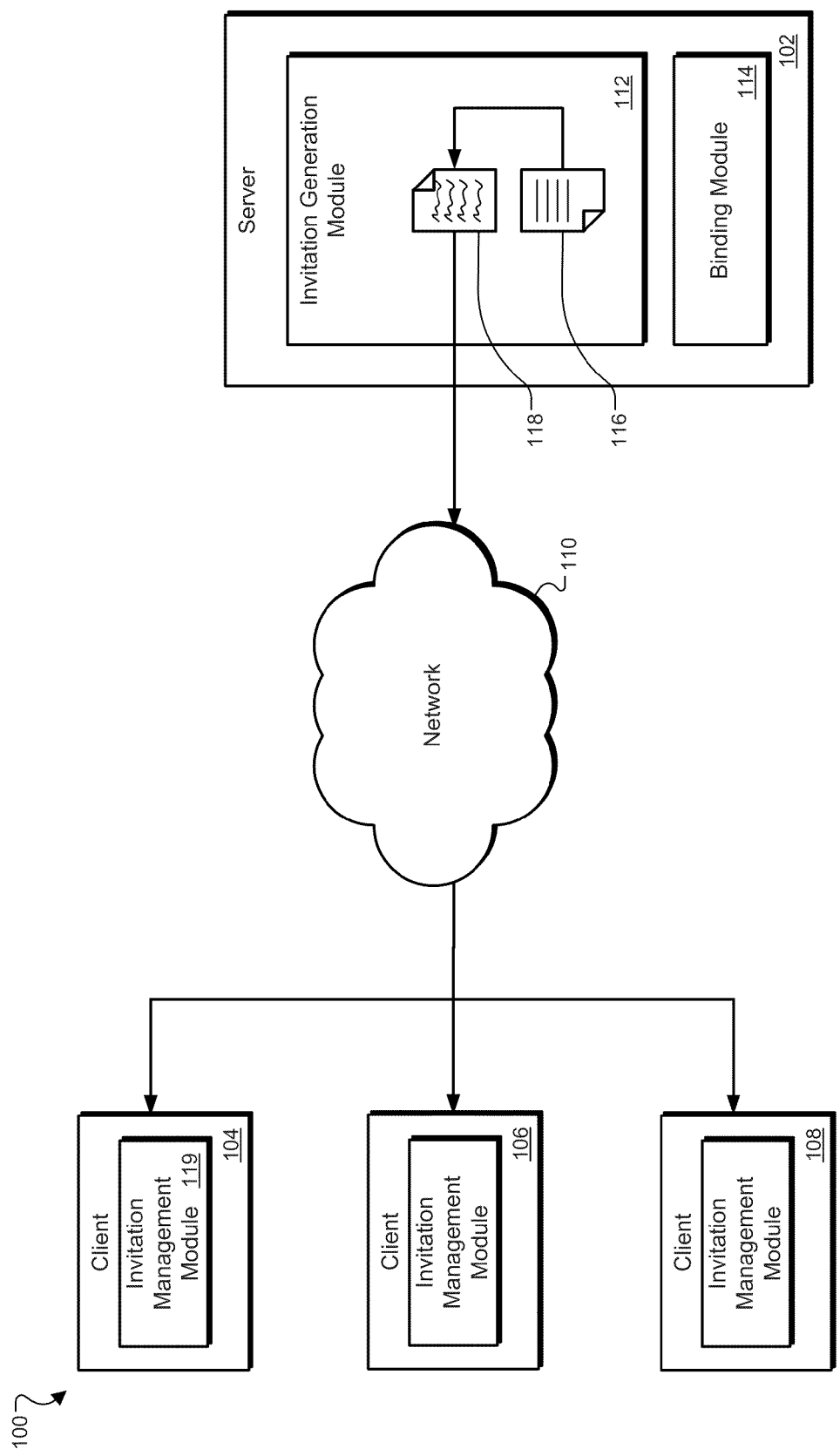
FIG. 1 is a block diagram of an exemplary system that can be used to invite one or more client devices to bind to a server device.

FIG. 1 is a block diagram of an exemplary system 100 in which one or more client devices can be invited to bind to a server device 102. The system 100 here includes three client devices (104, 106, and 108) that are capable of be connected to the server device 102 via a network interface 110 (e.g., local area network, wireless network, Internet, intranet, etc.). Three client devices have been shown for simplicity; however, more or fewer client devices can exist in the system 100.

The server 102 includes an invitation generation module 112 and a binding module 114. The invitation generation module 112 can be invoked to extend invitations to bind to the server. For example, there may exist many client devices that are currently not bound to this particular server. The server can send out invitations to a class of devices (such as all devices within a transmission range of a wireless network). Here, any or all of client devices 104, 106 and 108 can receive an invitation to bind to the server. For example, the invitation can be created from user data on the server 102, and a decision can be made on any receiving client device based on the content of the invitation whether to display the invitation.

The binding module 114 can connect one or more client devices to the server device. For example, the client device 108 can contact the server with user account information that matches information located on the server 102, and the user account information can be authenticated by the server 102. The binding module 114 can then provide the necessary configuration for the client device 108.

User accounts 116 can be created on the server 102 upon setup of the server, dynamically added, or otherwise added as requested. For example, the accounts are assigned to users who are registered to log in on the server. Upon preparing to issue an invitation, the server 102 can generate a record 118 by, in one implementation, hashing the available user accounts 116. The hashed record can be broadcast to client devices which can use the hashed information to determine whether one or more entries match the user data. Records 118 can include names, variations of names, network identification information, or other identifying characters relating to their respective client devices. Thus, the invitation generating module can obtain the names of the users registered for the server (i.e., from the user accounts 116), hash them into a secure list, and distribute the list together with the invitation to bind to the server. The full name or a portion thereof (such as with or without a middle initial) can be used, to name a few examples. Hashing is mentioned here as one example, and records 118 can otherwise be encrypted, encoded, or otherwise masked to ensure user names and identities are not explicitly broadcast to other users.

Network technologies can broadcast the encrypted or hashed records 118 in connection with an invitation about an available binding opportunity. For example, the server 102 may broadcast the user records 118 to invite or make client devices aware of a service available from the server 102, such as printing or file sharing services. One example of a network technology that can broadcast user records 118 is Bonjour™ (available from of Apple Computer in Cupertino, Calif.). Bonjour™ can be configured to broadcast the hashed record(s) as part of a registration program. The broadcast can include a hashed or encrypted list of approved user accounts or previous users of the network. Client devices can receive this broadcast in any of many different ways, for example when periodically searching for this type of registration broadcast.

Any client device that receives the registration broadcast can determine whether there is a match between the current user's name and any of the information on the list. For example, the client device can hash the current user account information (located on the client device), compare it with the server's broadcasted list, and thereby determine whether or not a particular user account matches a record on the server 102. This can be done using an invitation management module 119 on the client device, for example as will now be described.

The client devices 104, 106 and 108 include invitation management modules 119 for receiving and managing invitations for binding to servers. The invitation management module 119 can determine whether an invitation should be shown to the user of the client device 104. For example, the invitation management module 119 can use information in the invitation to decide whether the server is one that the user will likely want to connect with. In addition, the invitation management module 119 can track when a user declines a particular invitation and suppress similar invitations in the future.

The invitation management module 119 can receive the invitation and process the information in the invitation before determining to present the invitation to the user of the client device. Processing can include decryption and comparison of the hashed record 118 sent in the invitation. The comparison can determine whether the client device (or its user) is identified in the hashed record 118. Additionally, several other comparisons can be made between data included on the client device and data included in the invitation. For example, the invitation management module 119 can make a comparison between last used services and the services available when binding with the server 102 that initiated the invitation. As another example, the invitation management module 119 can, upon initially determining that the user's full name does not match any information in the invitation, proceed with comparing a portion of the name (or, say, a combination of the first initial and the last name) to determine whether there is a match. In one implementation, the correspondence of two separate pieces of information (such as a user's last name and a portion of the user's address) with information in the invitation can qualify as a match. Other processing steps are possible and responses to invitations can be previously defined by one or more users of the client device.

The invitation management module 119 can determine not to present the invitation to the user if there is no match between the user name and the list in the invitation. In some implementations, the invitation can be stored in memory with a declined status allowing the client device to easily determine whether or not to display a similar invitation to the user at a future time. Alternatively, the invitation and included information may be discarded.

The invitation management module 119 can also determine to present the invitation to the user, for example on a display device. The invitation can be presented in the form of a pop-up dialog box, a hover screen, an email message, a bubble message, or other graphical or audio message format indicating a response is requested by the client device. In one implementation, the invitation can include a link that can be activated to bind the client device 104 to the server device 102. The invitation may also include information corresponding to specific client device information. For example, the invitation may include operating system specific data advising the user of the client device to perform other operations, such as upgrading a software version, or unplugging an external device before binding. In some implementations, the invitation can include additional information about the server, advertising data, or versioning data, to name a few examples.

Invitations can generally be sent to any or all client devices that come within a specific distance of a wireless service, regardless of whether or not the client device is registered on the server hosting the service. For example, a wireless network service can be located in a library or coffee shop where users are regularly entering and leaving the server's wireless area network. In wired implementations, the invitations can be sent to devices within a certain namespace of an address register, or to devices located within a particular geographic location (such as in a building), to name a few examples.

Although the system 100 utilizes a "multiple clients" to "one server" network architecture, it should be understood that other network architectures can be used. For example, multi-tier client-server architectures may be used in which different service components can be developed and hosted on multiple server devices. Another example of an architecture for system 100 is a peer-to-peer architecture in which each device can function as either a client, or a server, and further may have the capability to broadcast their own services to one another.

Figure 2:
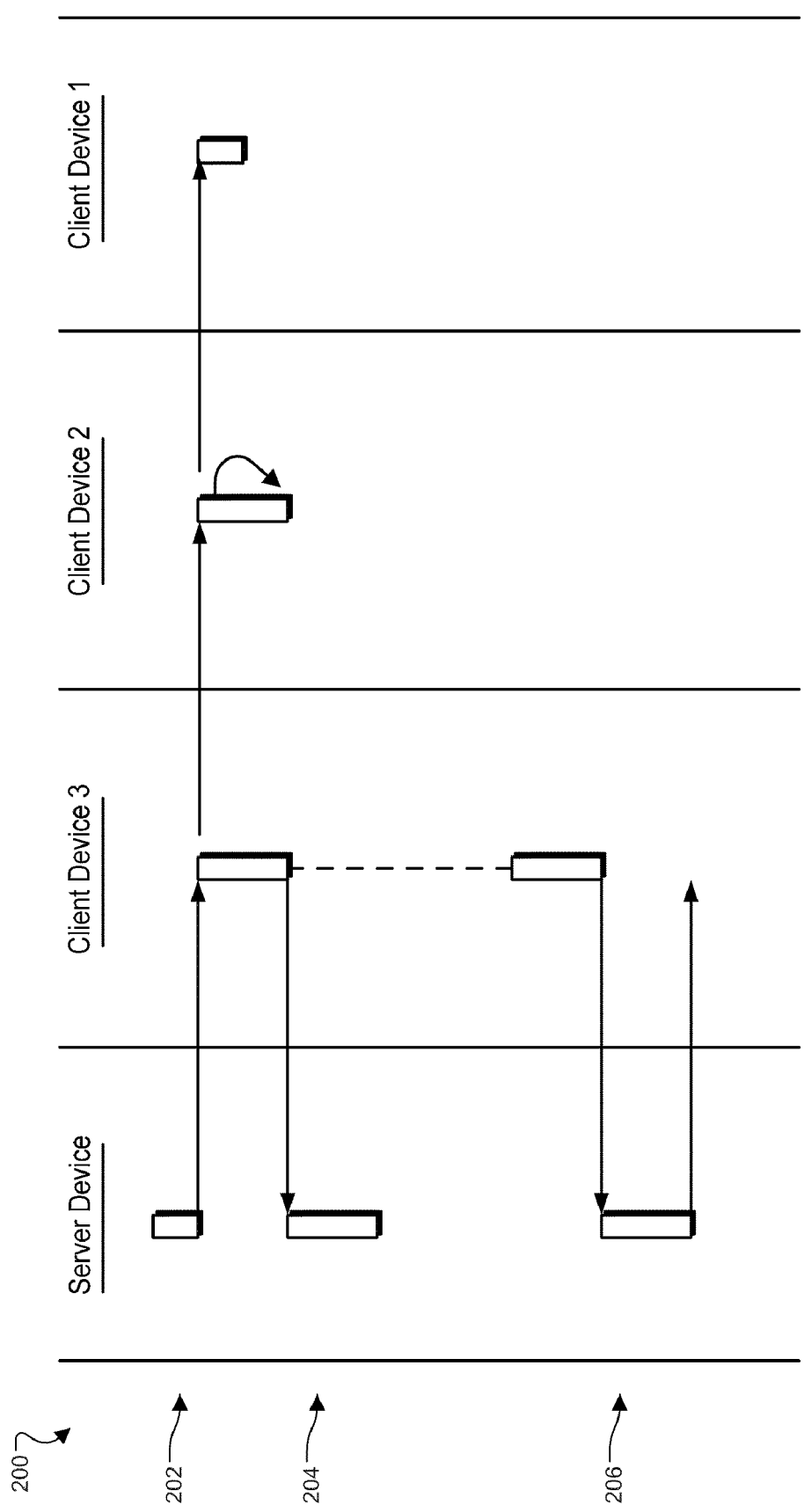
FIG. 2 is a swim lane diagram showing exemplary invitation transmissions to client devices.

FIG. 2 is a swim lane diagram 200 showing exemplary invitation transmissions to client devices. The invitations to bind to the server device 102 can be transmitted by the server device 102 over the network 110. An invitation transmission can begin with the server device 102 broadcasting, in operation 202, an invitation to several client devices, here labeled Client Device 1, Client Device 2 and Client Device 3.

Here, the Client Device 3 does not present the invitation. For example, a match cannot be determined between the broadcasted record(s) and the user account on the Client Device 3. Further, in some implementations the server does not alter its list to be used for future broadcasts based on the non-response, under the assumption that a non-response indicates that the invitation was inadvertently sent to a non-registered user.

Here, the Client Device 2 finds a match between a user account and the invitation. The invitation is therefore displayed on this device. However, in this example the user declines the invitation to bind to the server. Upon the invitation being declined, the Client Device 2 can implement measures such that the invitation is not presented to the user again in the future. Further, in some implementations the server does not alter its list to be used for future broadcasts based on the invitation being declined, under the assumption that a non-response indicates that the invitation was inadvertently sent to a non-registered user.

Here, the Client Device 1 finds a match between a user account and the invitation and therefore displays the latter, similar to the Client Device 2, but here the user accepts the invitation to bind to the server. Thus, the client-server connection will be established, as indicated by operation 204 in the figure. Moreover, the server can remove the user account from the hashed list based on this user having responded to the invitation. After the client device has been bound to the server, they can engage in client-server communications, for example as indicated in operation 206.

Figure 3:
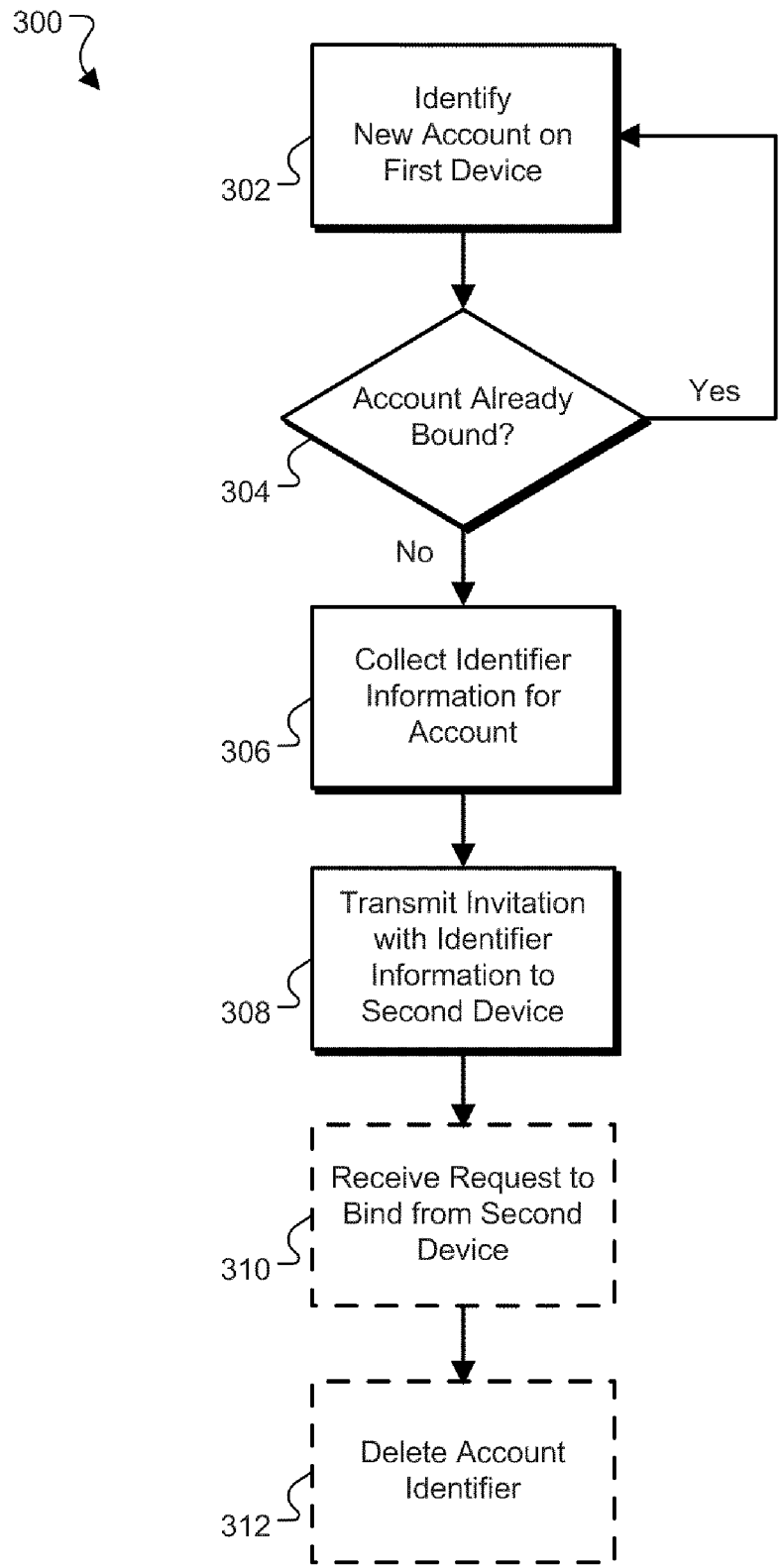
FIG. 3 is a flow chart of exemplary operations that can be performed to invite a device to bind to another device.

FIG. 3 is a flow chart of exemplary operations 300 that can be performed to invite a device to bind to another device. The operations 300 can be performed by a processor executing instructions stored in a computer program product. The operations 300 begin in steps 302 and 304 with identifying, on a first device, at least one account for which another device has not been bound to the first device. For example, user account information can be identified on the server device 102 that indicates no client device has been bound to the server device 102 for a specific account (e.g., because the account is new). If the account has been bound to the first device, the operations 300 return to step 302 to process another account.

For any account where no device has been bound to the server, identifier information for the account will be collected, and optionally analyzed, in step 306. Identifier information can include (part of) a name of an account holder, a network identification, or other identifying protocol that the server 102 recognizes as a potential client device identification, to name some examples. In some implementations, identifier information can be generated by encrypting an identifier for a client device.

Upon identifying at least one unbound device and optionally encrypting the identifier information for the device(s), the first device can generate and transmit the invitation with the identifier information to the second device, in step 308. For example, the server 102 can generate the invitation from identifier information in the invitation generation module 112. The server 102 can then transmit the invitation to the client devices 104-108.

Receiving devices can handle the invitation according to their respective configuration. For example, some client devices can process the list to determine if there is a match with the current client device, and present the invitation only after such a match has been found. Other client devices can present every received invitation without attempting to determine whether there is a match.

The first device can receive one or more requests to bind from the receiving devices in optional step 310. For example, in the FIG. 2 example Client Device 3 did bind to the server and the others did not. Upon binding a recognized device, the operations 300 can remove the account from the list in step 312 so that it is not included in future invitations.

Figure 4:
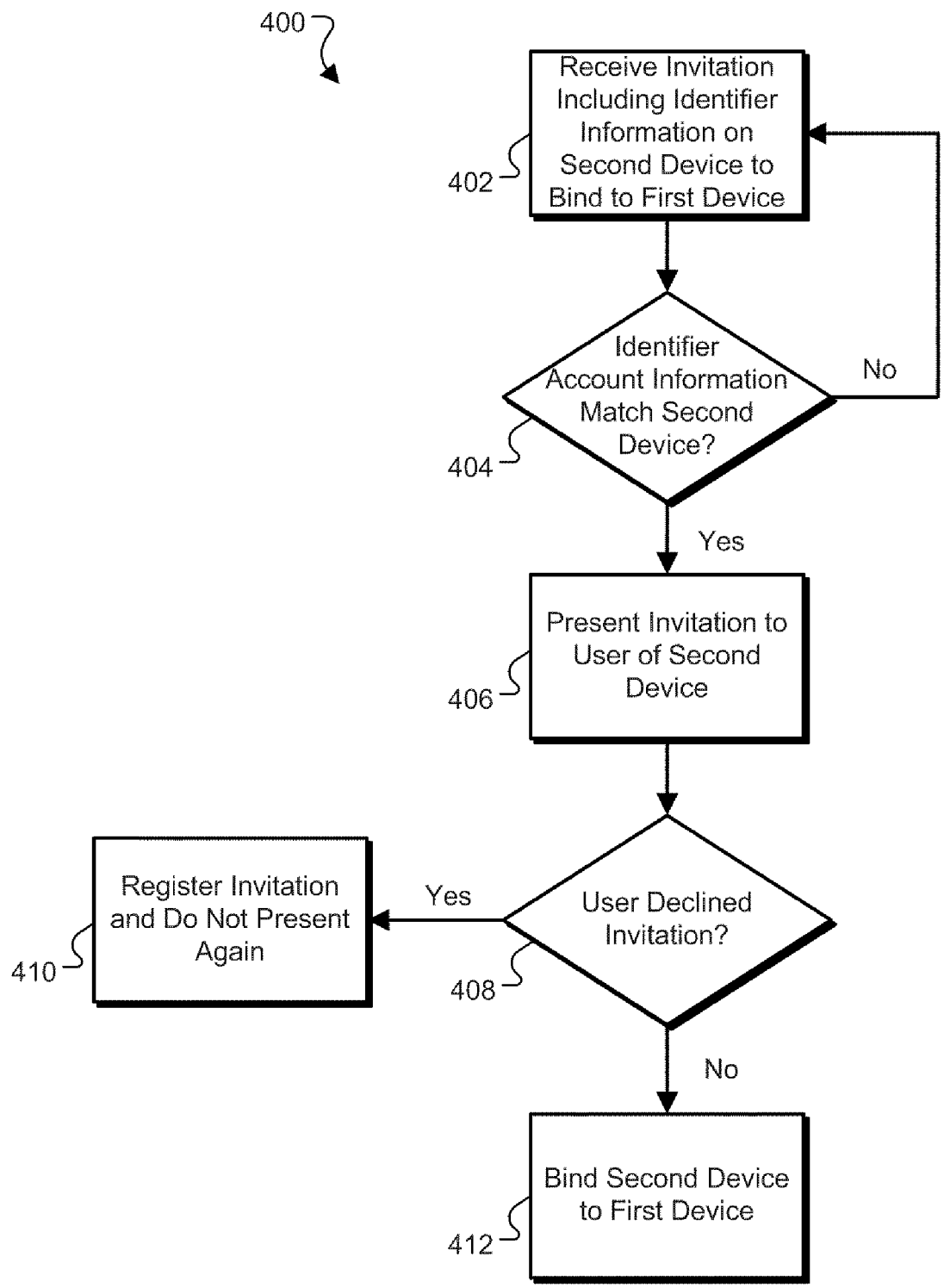
FIG. 4 is a flow chart of exemplary operations that can be performed to handle an invitation to bind a device to another device.

FIG. 4 is a flow chart of exemplary operations that can be performed to handle an invitation to bind a device to another device. The operations 400 can be performed by a processor executing instructions stored in a computer program product. The operations begin in step 402 with receiving an invitation to bind to a first device. For example, the invitation can be received by the client device 108 to bind to the server device 102. In this example, the server device 102 can identify at least one account for which no device has been bound to the server device 102 (i.e., there exists registered users who are not currently bound to the server 102). The account can include a name, or network identification of an account holder. For example, when the account is configured, the user name or identification can be associated with the account holder.

The received invitation (402) generally includes identifier information about the second device to allow a (e.g., software) module, such as an invitation management module, to perform a comparison between received invitation data and data resident on the second device. In step 404, the operations comprise determining whether the identified account matches the second device. For example, the invitation management module 119 can hash the identifier account information on the client device and compare it to the received account information. If a match is not determined, the operations 400 return to step 402 to await receipt of another invitation.

If a match is determined, the operations 400 can present the invitation to the user of the second device (e.g., the client device 108) in step 406. The second device can choose whether to accept or decline the invitation to bind to the first device, in step 408. For example, the client device 108 can use the invitation management module to determine whether or not to present the invitation, and upon the invitation being presented the user can decide whether to accept the invitation. If the invitation is declined, the second device can register the invitation so as to not present the invitation to the user again, in step 410. For example, the invitation can be flagged as unwanted or ranked low in a list of received invitations, such that a faster determination can be made if another invitation is received in the client device 108. If the invitation to bind to the first device is accepted, the binding will be performed in step 412. For example, when the client device 108 accepts the invitation, the binding module 114 in the server device 102 binds the client device 102 to the server device 102 over the network 110.

Figure 5:
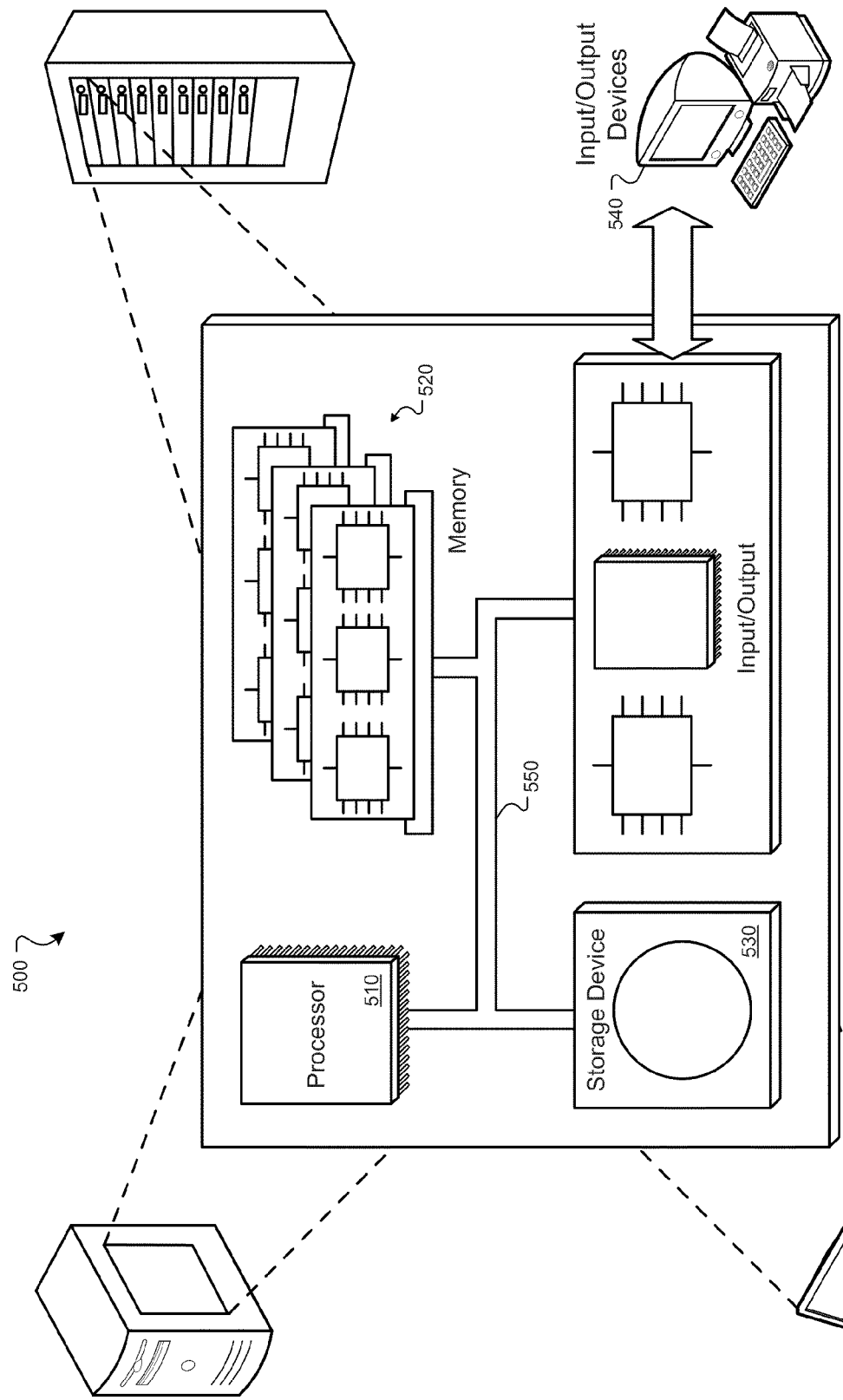
FIG. 5 is a schematic diagram illustrating a general computer system.

FIG. 5 is a block diagram illustrating a general computer system 500. The system can be used for the operations described above according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for inviting a device to bind to another device, the method comprising:
    identifying, on a first device, at least one account for which another device has not been bound to the first device; and
    transmitting, from the first device, an invitation to bind to the first device, the invitation including information corresponding to an identifier for each of the identified at least one account.

2. The computer-implemented method of claim 1, wherein the at least one account is identified on a list of accounts for which another device has not been bound to the first device, and wherein after the invitation is transmitted a second device binds to the first device for an account on the list, further comprising removing the account from the list after the binding.

3. The computer-implemented method of claim 1, wherein the invitation includes a link that can be activated to bind to the first device.

4. The computer-implemented method of claim 1, wherein the information comprises, for each of the identified at least one account, a name of an account holder.

5. The computer-implemented method of claim 1, wherein the information corresponding to the identifier is generated by encrypting the identifier.

6. The computer-implemented method of claim 1, wherein the first device is a server device and the invitation is transmitted to at least one client device.

7. A computer program product tangibly embodied in a non-transitory information carrier and comprising instructions that, when executed by a processor, cause the processor to perform operations comprising:
    identifying, on a first device, at least one account for which another device has not been bound to the first device; and
    transmitting, from the first device, an invitation to bind to the first device, the invitation including information corresponding to an identifier for each of the identified at least one account.

8. The product of claim 7, wherein the at least one account is identified on a list of accounts for which another device has not been bound to the first device, and wherein after the invitation is transmitted a second device binds to the first device for an account on the list, further comprising removing the account from the list after the binding.

9. The product of claim 7, wherein the invitation includes a link that can be activated to bind to the first device.

10. The product of claim 7, wherein the information comprises, for each of the identified at least one account, a name of an account holder.

11. The product of claim 7, wherein the information corresponding to the identifier is generated by encrypting the identifier.

12. The product of claim 7, wherein the first device is a server device and the invitation is transmitted to at least one client device.

13. A system comprising:
one or more processors configured to perform operations comprising:
identifying, on a first device, at least one account for which another device has not been bound to the first device; and
transmitting, from the first device, an invitation to bind to the first device, the invitation including information corresponding to an identifier for each of the identified at least one account.

14. The system of claim 13, wherein the at least one account is identified on a list of accounts for which another device has not been bound to the first device, and wherein after the invitation is transmitted a second device binds to the first device for an account on the list, further comprising removing the account from the list after the binding.

15. The system of claim 13, wherein the invitation includes a link that can be activated to bind to the first device.

16. The system of claim 13, wherein the information comprises, for each of the identified at least one account, a name of an account holder.

17. The system of claim 13, wherein the information corresponding to the identifier is generated by encrypting the identifier.

18. The system of claim 13, wherein the first device is a server device and the invitation is transmitted to at least one client device.

* * * * *